United States Patent
Chang

(10) Patent No.: US 6,363,578 B1
(45) Date of Patent: Apr. 2, 2002

(54) HANDLE OF PISTOL NOZZLE

(76) Inventor: Jung-Hsien Chang, 7F-2, No. 5 Fu An 7th St., Fu An Li-Shi-Tun Chu, Taichung (TW)

( * ) Notice: Subject to any disclaimer, the term of this patent is extended or adjusted under 35 U.S.C. 154(b) by 0 days.

(21) Appl. No.: 09/572,507

(22) Filed: May 15, 2000

(51) Int. Cl.[7] .................................................. A47J 45/10
(52) U.S. Cl. ...................... 16/430; 16/111.1; 16/110.1
(58) Field of Search ................................ 16/430, 111.1, 16/110.1, 431, DIG. 12; 239/505, 526, 530; 81/177.1, 489; 15/143.1, 350, 351, 361

(56) References Cited

U.S. PATENT DOCUMENTS

| | | | | |
|---|---|---|---|---|
| 3,189,069 A | * | 6/1965 | Stowell | 16/430 |
| 4,645,235 A | * | 2/1987 | Joseph | 280/821 |
| 4,729,271 A | * | 3/1988 | Kenigson | 81/177.1 |
| 4,837,892 A | * | 6/1989 | Lo | 16/116 R |
| 4,997,131 A | * | 3/1991 | Heren | 239/397.5 |
| 5,347,684 A | * | 9/1994 | Jackson | 16/111 R |
| 5,640,741 A | * | 6/1997 | Uano | 16/114 R |
| 6,108,870 A | * | 8/2000 | Lo | 16/431 |

* cited by examiner

*Primary Examiner*—Anthony Knight
*Assistant Examiner*—Mark Williams
(74) *Attorney, Agent, or Firm*—W. Wayne Liauh

(57) ABSTRACT

A handle of a pistol nozzle with improved gripping comfort. It contains an inner tube and an outer tube and a soft cover engageable with the inner tube to cover the inner tube. The soft cover is structured such that the soft cover and the outer tube integrally form separate external portions of the handle. The inner tube is provided along a longitudinal direction with two elongated side wings and a raised elongated rib for engaging with the soft cover. And the soft cover is provided with a recessed portion. The recessed portion is provided with a plurality of elongated slots, the elongated slots being engaged with the wings of the inner tube.

2 Claims, 4 Drawing Sheets

FIG.3-B
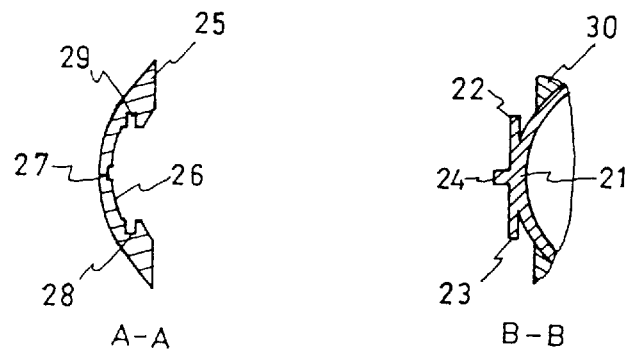
A-A    B-B
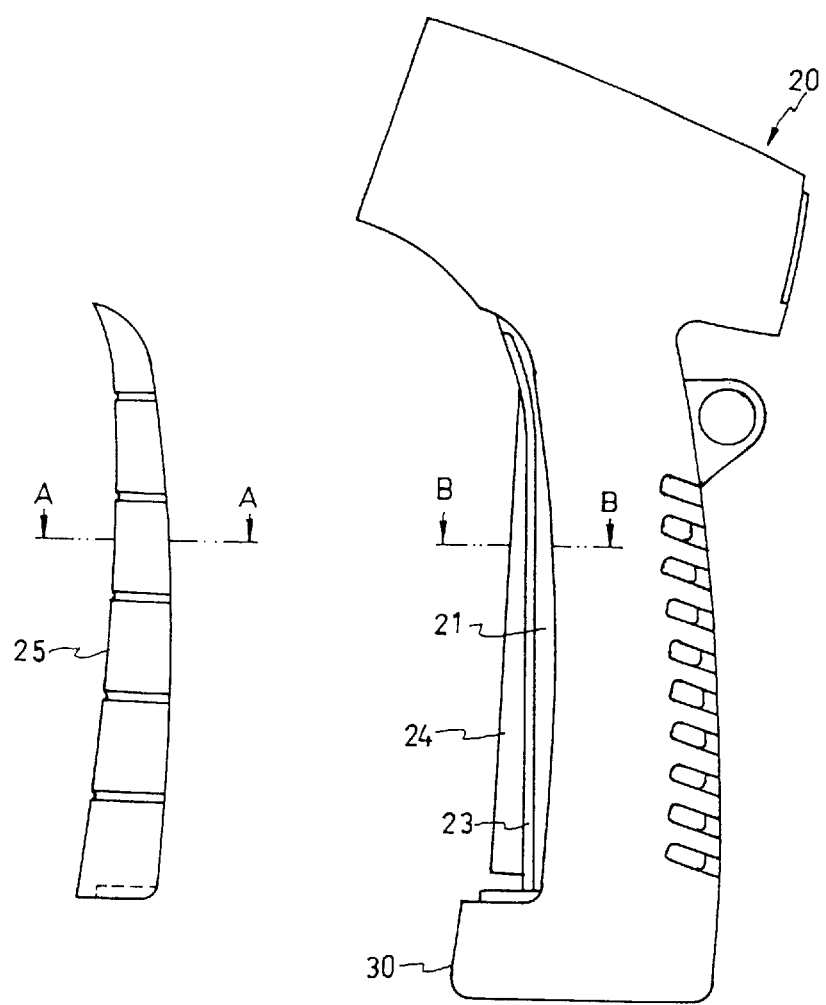
FIG.3-A

HANDLE OF PISTOL NOZZLE

FIELD OF THE INVENTION

The present invention relates generally to a pistol nozzle, and more particularly to a handle of the pistol nozzle.

BACKGROUND OF THE INVENTION

As shown in FIG. 1, a pistol nozzle 10 of the prior art comprises a handle 11 which is provided in one longitudinal side thereof with a skidproof portion formed of a plurality of soft strips 12. The soft strips 12 are made integrally with the handle 11 such that the soft strips 12 are arranged at an interval. The soft strips 12 serve to enhance the contact friction between the handle 11 and the palm of a user's hand holding the pistol nozzle 10. The handle 11 as described above is defective in design in that the interstices 13 of the skidproof portion of the handle 11 are apt to gather foreign objects which may promote the growth of bacteria or fungi. In addition, it is not easy to get rid of the undesirable objects which are deposited in the interstices 13. Moreover, the soft strips 12 are susceptible to deformation or damage. It is uncomfortable for the user of the pistol nozzle 10 to hold the deformed or damaged soft strips 12. In light of the integral formation of the soft strips 12, the handle 11 is not cost-effective at best.

As shown in FIG. 2, another prior art pistol nozzle comprises a handle 14 which is provided with a corrugated cover fitted thereover. The corrugated cover is effective in providing the handle 14 with a skidproof surface; nevertheless it does not provide a user's hand with a gripping comfort.

SUMMARY OF THE INVENTION

The primary objective of the present invention is to provide a pistol nozzle with a handle which is free from the drawbacks of the prior art handles described above.

The features and the advantages of the present invention will be readily understood upon a thoughtful deliberation of the following detailed description of a preferred embodiment of the present invention with reference to the accompanying drawings.

BRIEF DESCRIPTION OF THE DRAWINGS

FIG. 3A shows a schematic view of a pistol nozzle handle of the present invention.

FIG. 3B includes two sectional view taken respectively along the directions indicated by the lines A—A and B—B as shown in FIG. 3A.

DETAILED DESCRIPTION OF THE PREFERRED EMBODIMENT

Figure 1:
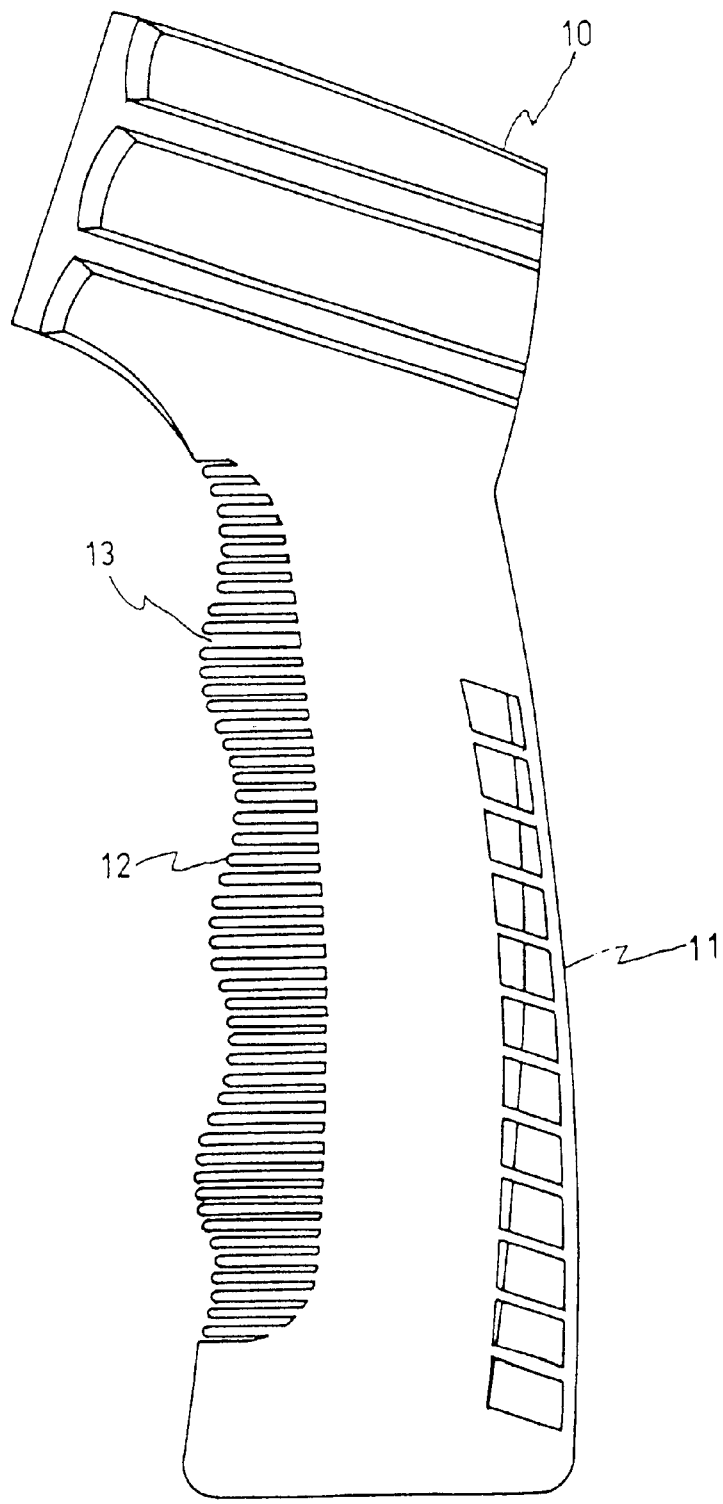
FIG. 1 shows a schematic view of a handle of a prior art pistol nozzle.
Figure 2:
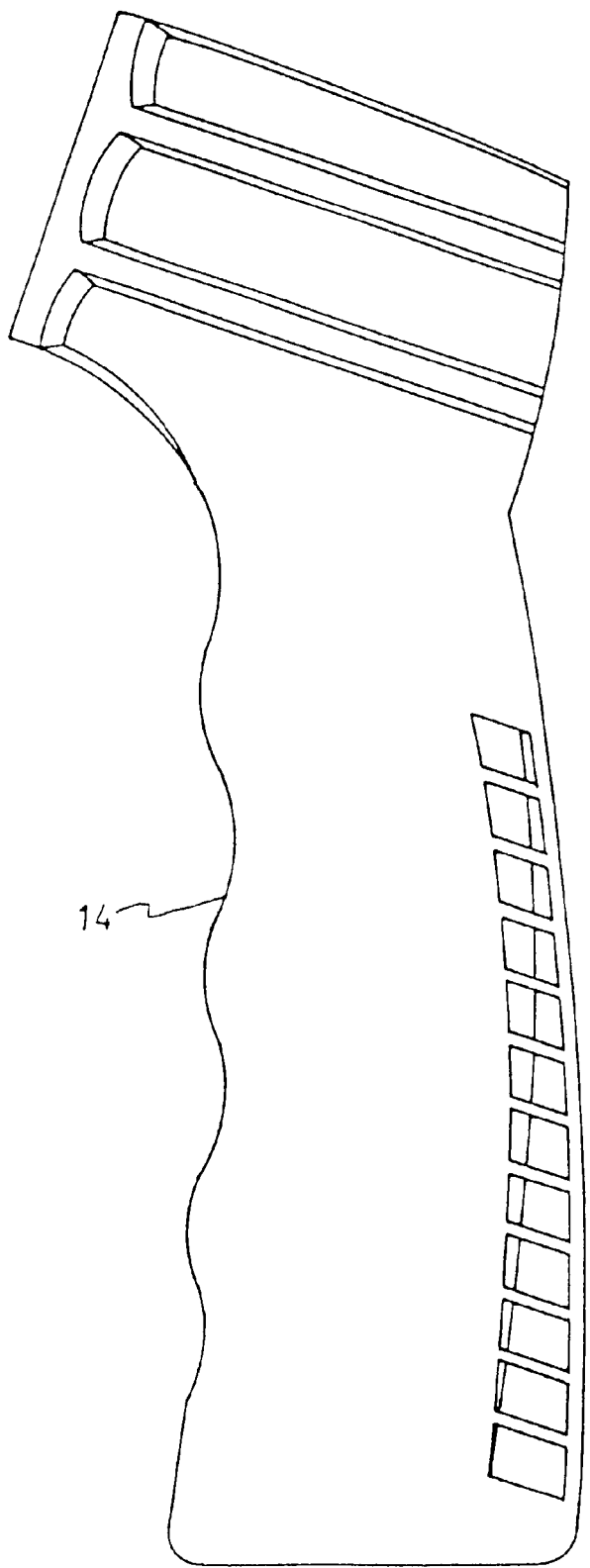
FIG. 2 shows a schematic view of a handle of another prior art pistol nozzle.
Figure 4:
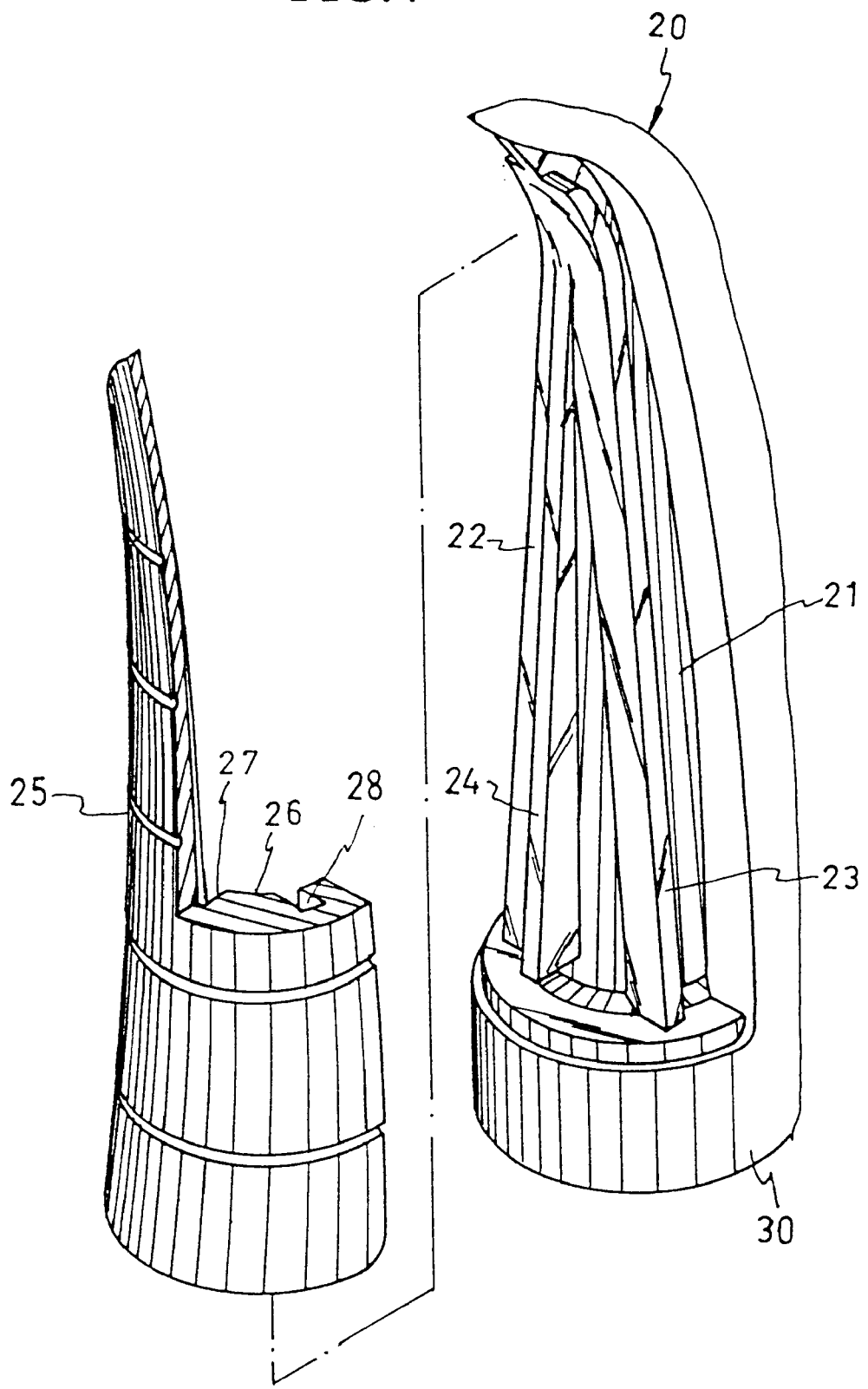
FIG. 4 shows an exploded view of the preferred embodiment of the present invention .

As shown in FIGS. 3–4, a pistol nozzle handle 20 embodied in the present invention is formed of an inner tube 21 and an outer tube 30. The handle 20 of the present invention is made by injection molding.

The inner tube 21 is provided along the longitudinal direction thereof with two side wings 22 and 23, and a raised rib 24. A soft cover 25 is provided with a recessed portion 26 which is in turn provided with three slots 27, 28, and 29. The soft cover 25 is joined with the inner tube 21 such that the slots 28 and 29 of the soft cover 25 are engaged with the side wings 22 and 23 of the inner tube 21, and that the opening end of the recessed portion portion 26 is in contact with the outer tube 30.

When the soft cover 25 is exerted on by an external force, the rib 24 of the inner tube 21 is forced into the slot 27 so as to confine the deformation of the soft cover 25, thereby preventing the material fatigue of the soft cover 25. In the meantime, the upper ends of the side wings 22 and 23 are also forced into the recessed portion 26. As a result, the soft cover 25 is intimately joined with the inner tube 21.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A handle of a pistol nozzle having an external surface, said handle comprising;

an inner tube and an outer tube;

a soft cover engageable with said inner tube to cover said inner tube;

wherein said soft cover is structured such that said soft cover and said outer tube intimately join to form the external surface of said handle, said inner tube is provided along a longitudinal direction with two side wings and a raised rib for engaging with said soft cover.

2. The handle as defined in claim 1, wherein said soft cover is provided with a recessed portion wherein said recessed portion is provided with a plurality of slots, said slots being engaged with said wings of said inner tube.

* * * * *